United States Patent [19]
Stant et al.

[11] 3,981,207
[45] Sept. 21, 1976

[54] MOTOR VEHICLE THROTTLE CONTROL

[76] Inventors: Ivan H. Stant, 2103 Indiana Ave.;
Arville E. Bertsch, R.R. No. 1, both
of Connersville, Ind. 47331

[22] Filed: June 20, 1975

[21] Appl. No.: 588,774

Related U.S. Application Data

[63] Continuation-in-part of Ser. No. 469,964, May 13, 1974, abandoned.

[52] U.S. Cl. .................................. 74/513; 123/98; 180/105 R
[51] Int. Cl.² .......................................... G05G 1/14
[58] Field of Search ................. 74/513, 512, 514; 123/98, 97 R; 180/105 R; 267/176

[56] References Cited
UNITED STATES PATENTS

| | | | |
|---|---|---|---|
| 2,381,390 | 8/1945 | Vanke | 74/513 X |
| 2,661,941 | 12/1953 | Smith | 123/98 X |
| 2,895,346 | 7/1959 | Arch, Jr. | 74/513 X |
| 3,308,678 | 3/1967 | Walker | 74/513 X |

*Primary Examiner*—Benjamin W. Wyche
*Assistant Examiner*—F. D. Shoemaker
*Attorney, Agent, or Firm*—Woodard, Weikart, Emhardt & Naughton

[57] ABSTRACT

A control to yieldably restrain the depression of the accelerator pedal of a motor vehicle after a certain initial amount of depression. A spring is coupled at a first end to either the accelerator pedal or throttle linkage such that free travel of the accelerator pedal and linkage is allowed over a predetermined distance, and thereafter further movement of the accelerator pedal and linkage is opposed by the action of the spring second end being biased against a fixed portion of the motor vehicle.

5 Claims, 13 Drawing Figures

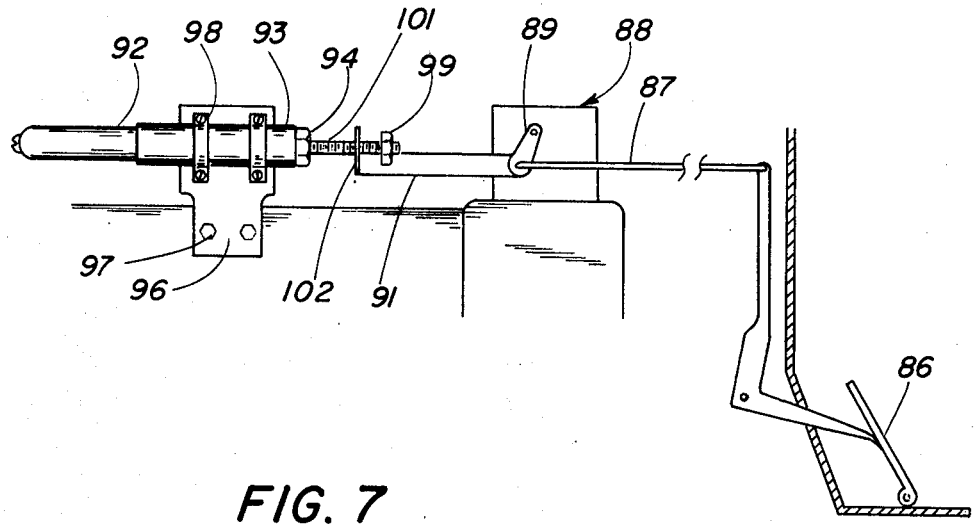
FIG. 7
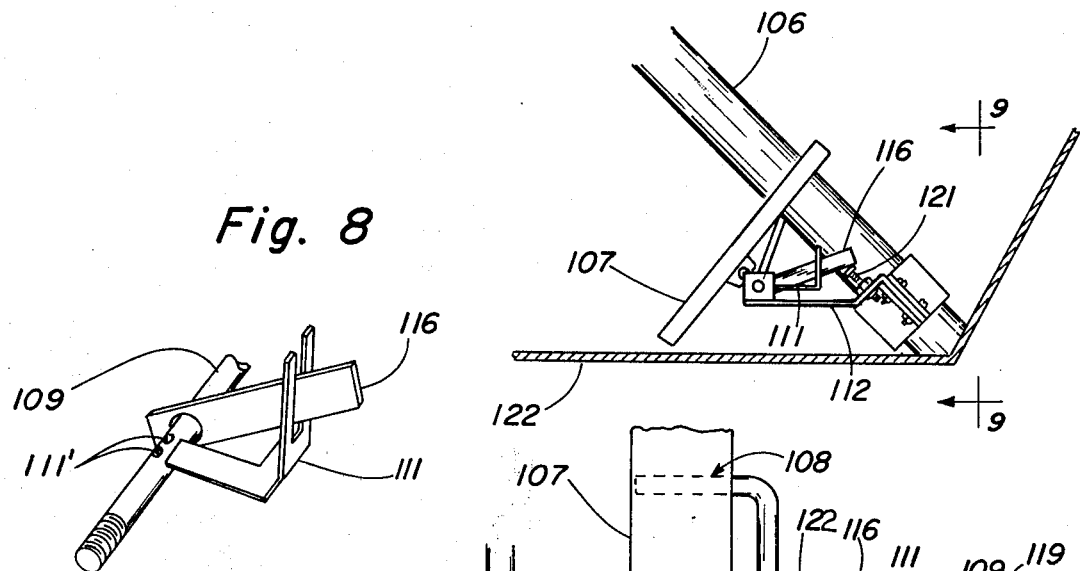
Fig. 8
Fig. 11
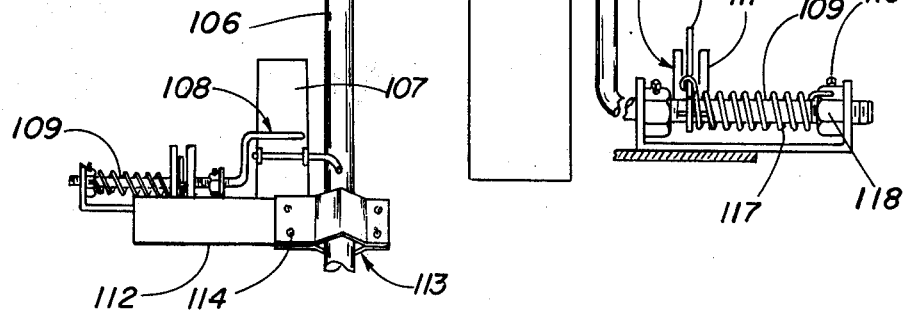
Fig. 9
Fig. 10

MOTOR VEHICLE THROTTLE CONTROL

CROSS-REFERENCE TO RELATED APPLICATION

This application is a continuation-in-part of application SN 469,964 filed May 13, 1974, now abandoned.

BACKGROUND OF THE INVENTION

1. Field of the Invention

The invention is in the field of speed regulators for motor vehicles.

2. Description of the Prior Art

Various devices to limit the speed of a motor vehicle have been proposed. Such speed governor devices have sensed various conditions of the motor vehicle and in response to these conditions affected the operation of the motor vehicle throttle or carburetor. For example, U.S. Pat. No. 2,965,189 to Chimko and U.S. Pat. No. 2,192,714 to Norman et al. utilize the sensing of conditions of the motor vehicle transmission to affect the throttle.

U.S. Pat. No. 2,912,058 to Sandor shows the sensing of vehicle speed from the speedometer cable being used to control an auxilliary throttle. U.S. Pat. No. 3,050,147 to Teetor shows the use of an electric motor to oppose the activation of the motor vehicle throttle, and U.S. Pat. 2,519,859, also to Teetor shows the use of the intake manifold vacuum of the motor vehicle to oppose the movement of the throttle control by the operator of the motor vehicle.

U.S. Pat. No. 2,077,555 to Frantz shows the use of a spring bias arrangement between the accelerator pedal of the motor vehicle and a governor having a plate whose position is responsive to the speed of the vehicle such as through the accelerator cable.

Various yieldable spring devices have been shown for motor vehicle speed controls as shown in U.S. Pat. No. 2,349,742 to MacAvoy; 2,836,990 to DeHeer; 2,381,390 to Vanke; 2,042,202 to Althouse; 3,721,309 to Donaldson; 3,543,601 to Berger.

SUMMARY OF THE INVENTION

One embodiment of the present invention is, in a motor vehicle having an accelerator pedal couple through a linkage to a throttle control, the improvement which comprises speed control apparatus including spring means for opposing the depression of the accelerator pedal and consequent movement of the linkage after a predetermined amount of depression of the accelerator pedal unopposed by the spring means.

It is an object of the present invention to provide an inexpensive mechanical apparatus for opposing the opening of the throttle of a motor vehicle beyond a predetermined point.

It is a further object of the present invention to provide an inexpensive mechanical apparatus for altering the operator of a motor vehicle that he is opening the throttle of the motor vehicle beyond a predetermined amount.

Further objects and advantages of the present invention shall be apparent from the following detailed description and accompanying figures.

BRIEF DESCRIPTION OF THE DRAWINGS

FIG. 7 is a diagrammatic view of an embodiment similar to that of FIG. 4.

FIG. 8 is a side view of another embodiment of the present invention.

FIG. 9 is a view of the apparatus of FIG. 8 along the line 9—9 and in the direction of the arrows.

FIG. 10 is a front view of the apparatus of FIGS. 8 and 9.

FIG. 11 is an enlarged view of a portion of the embodiment of FIG. 8.

DESCRIPTION OF THE PREFERRED EMBODIMENT

Figure 1:
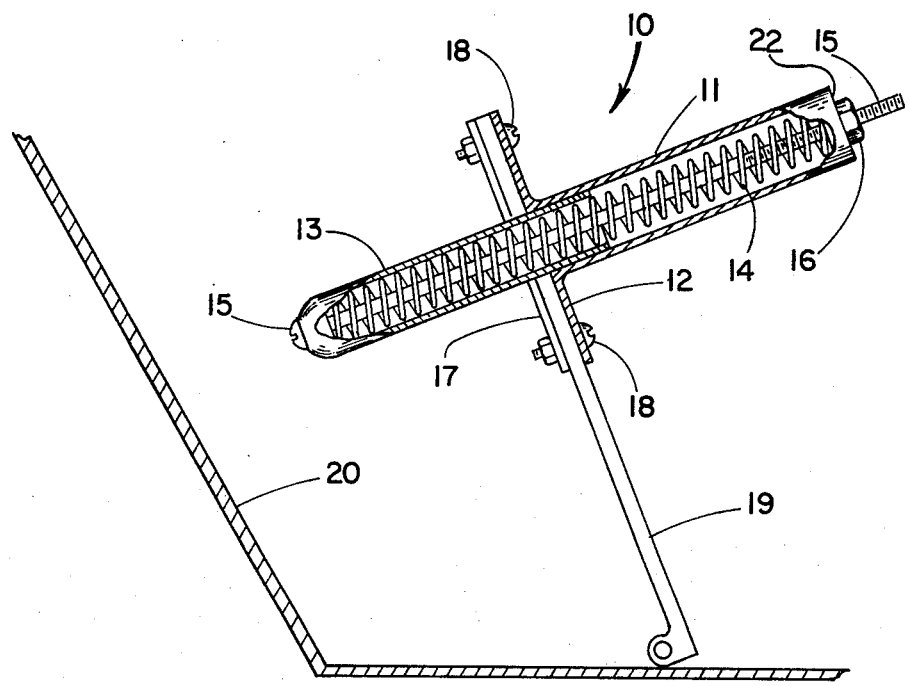
FIG. 1 is a side view partly in cross-section of an embodiment of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a throttle control 10 according to the present invention. Control 10 includes hollow shaft 13 which is slidably received within hollow shaft 11. Long bolt, or rod, 15 is received in an opening at the distal end of shaft 13 and extends through shafts 13 and 11 terminating in a threaded portion extending beyond the proximal end of shaft 11. Nut 16 is received in threaded engagement on the threaded end of rod 15, and as can be seen, the extent of the threaded engagement of nut 16 on bolt 15 determines the extent to which shaft 13 is received within shaft 11.

Mounted within shafts 11 and 13 is spring 14 which bears against the distal end of shaft 13 and the proximal end of shaft 11. Depending upon the tension of spring 14, more or less force is exerted to resist the movement of shaft 13 further into shaft 11. Shaft 11 includes a flat plate portion 12 which extends outwardly perpendicular to the axis of shaft 11. Plate 12 includes holes to receive bolts 18 which may extend either through or around accelerator pedal 19, depending upon the method of attachment. As shown in FIG. 1, bolts 18 extend beside pedal 19 and are received through holes in a second plate 17 which extends along the underside of pedal 19 and beyond the edge of the pedal to receive bolts 18. Bolts 18 are fastened to plates 17 and 18 with nuts as shown. Effectively, therefore, accelerator pedal 19 is "sandwiched" between plates 17 and 18.

Figure 4:
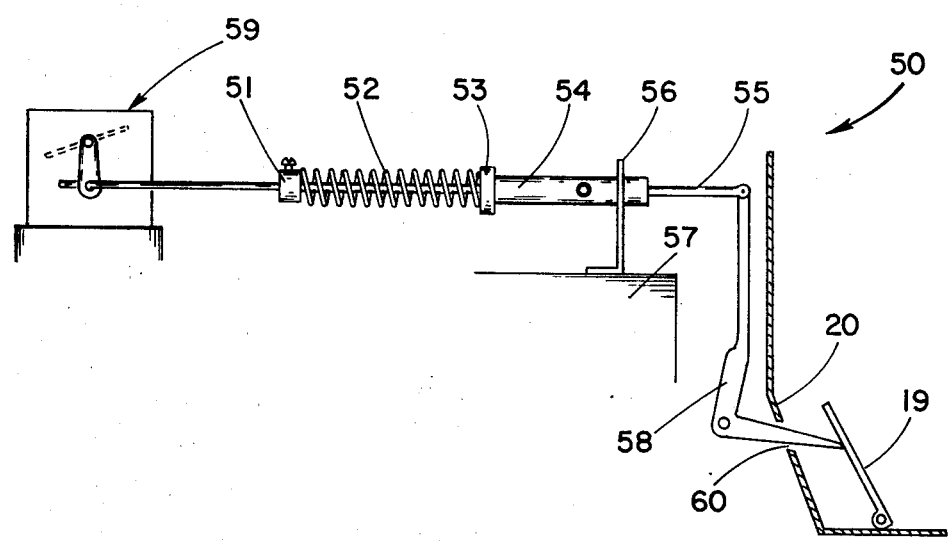
FIG. 4 is a diagrammatic view of still another embodiment of the present invention.

Accelerator pedal 19 is pivotally attached to the floor 20 of the motor vehicle and has a connection to a throttle or carburetor linkage (not shown), as that represented in FIG. 4. When accelerator pedal 19 is depressed about its pivot point toward floor board 20 of the motor vehicle, the throttle is opened effecting acceleration of the motor vehicle. As can be seen in FIG. 1, after accelerator pedal 19 has been depressed to the point that the head of bolt 15 at the distal end of shaft 13 contacts floor 20 of the motor vehicle, further depression of the accelerator pedal is resisted by the spring force of spring 14 within shafts 11 and 13. Further acceleration of the motor vehicle will be opposed by the spring as shaft 13 is forced further into shaft 11 against the resistance of spring 14. In this manner, the operator of the motor vehicle is made aware that he is exceeding a predetermined throttle level, but he is also able, against the resistance of spring 14, to open the throttle further if necessary. For example, the spacing between the distal end of shaft 13 and floor board 20 in its initial position may be established such that, on level ground with the depression of the accelerator pedal 19 to the point where the distal end of shaft 13 touches floor board 20, the motor vehicle is operating at a speed of 55 miles per hour. The spacing between the distal end of shaft 13 and floor board 20 may be adjusted by turning nut 16 on the threaded end portion of bolt 15. If bolt 16 is tightened, it will move shaft 13 further within shaft 11 against the tension of spring 14, and if bolt 16 is loosened, the tension of spring 14 will move shaft 13 further out of shaft 11.

Figure 2:
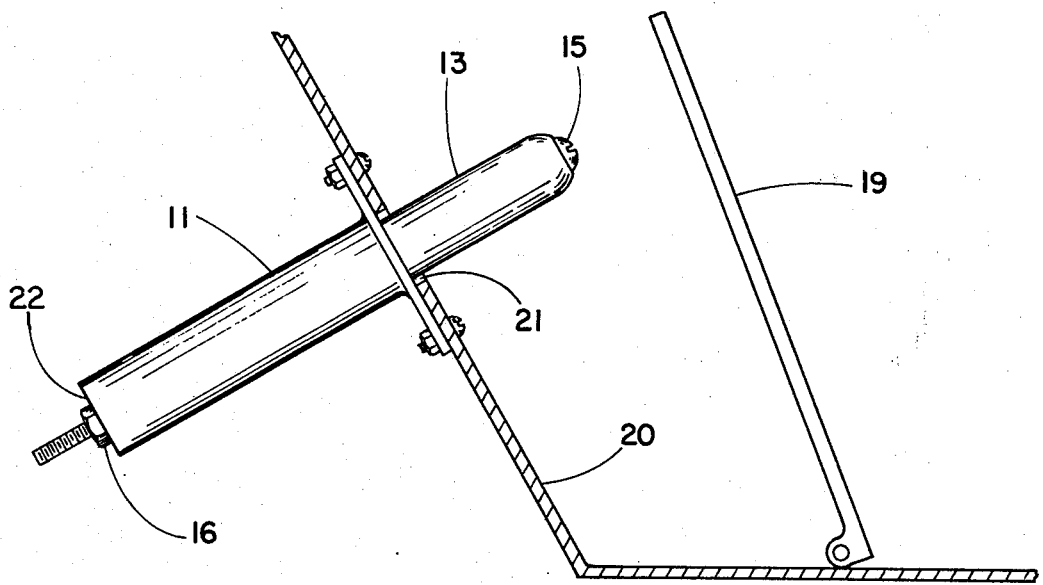
FIG. 2 is a side view of another embodiment of the present invention.

Referring now to FIG. 2, an apparatus similar to control 10 is shown mounted within the floor board 20 of the motor vehicle beneath accelerator pedal 19. Hollow shaft 13 is received within hollow shaft 11 and maintained in position by bolt 15 and nut 16, with internal spring 14, all as shown in the apparatus of FIG. 1. As in the apparatus of FIG. 1, nut 16 operates against flat end surface 22 of hollow shaft 11. A plate portion extends outward from hollow shaft 11, as shown, and is bolted to floor 20 of the motor vehicle. Interior hollow shaft 13 extends through opening 21 in floor board 20 into the passenger compartment area of the motor vehicle beneath accelerator pedal 19. Hole 21 and hollow shaft 13 are located such that when accelerator pedal 19 is depressed to open the throttle of the motor vehicle through the standard carburetor linkage, pedal 19 will contact the head of bolt 15 at the distal end portion of hollow shaft 13 after a certain portion of its travel.

As can be seen, the spacing between the initial, or "at rest", position of accelerator pedal 19 and the distal end of hollow shaft 13 may be adjusted by tightening or loosening bolt 16 in a similar fashion to the adjustment described above for apparatus 10. The spacing between the distal end of hollow shaft 13 and pedal 19 is set so that, for example, a speed of 55 miles per hour may be obtained on level ground before pedal 19 contacts the end of shaft 13. Thereafter, as with the apparatus of FIG. 1, further depression of accelerator pedal 19 is opposed by the tension of the spring within hollow shafts 11 and 13.

Figure 3:
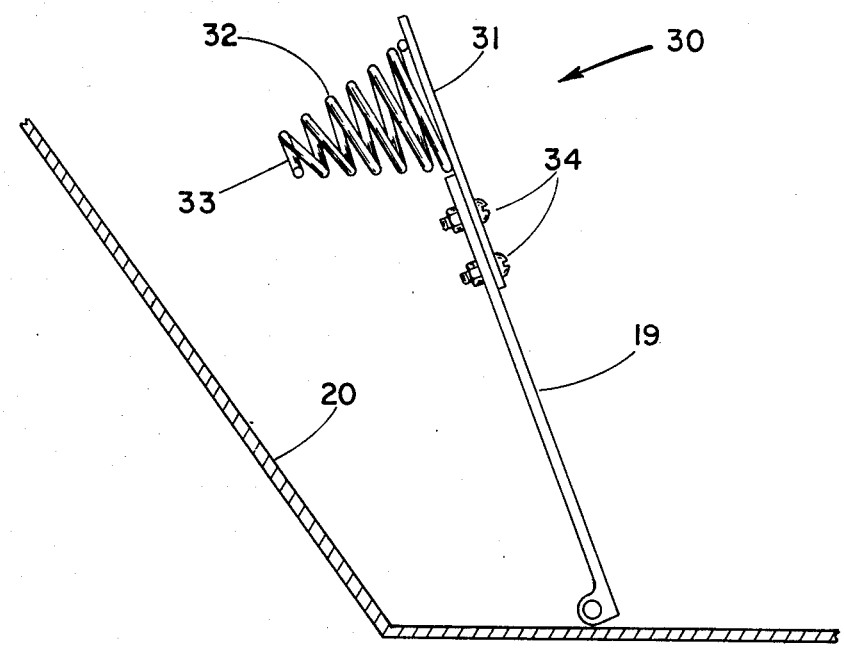
FIg. 3 is a side view of a further embodiment of the present invention.

Referring now to FIG. 3, there is shown another type of spring biasing apparatus 30 mounted upon accelerator pedal 19 between the underside of pedal 19 and the floor board 20. A volute spring 32 is rigidly attached at its base portion to plate 31 which is in turn attached to accelerator pedal 19 by nuts and and bolts 34 which pass through holes in pedal 19. The configuration of spring 32 of apparatus 30 is such that the end portion 33 of spring 32 will be received within the base portion of spring 32 when spring 32 is compressed. As can be seen in FIG. 3, due to the spacing between the distal end portion 33 of spring 32 and floor board 20, accelerator pedal 19 may be depressed a certain distance toward floor board 20 before contact of the spring with the floor board. Therefore pedal 19 may open the motor vehicle throttle through the carburetor linkage up to a predetermined amount before spring 32 contacts floor board 20. Once end portion 33 of spring 32 contacts floor board 20, further depression of accelerator pedal 19 is resisted by the tension of the spring. The spacing between end 33 of spring 32 and floor board may be adjusted to some extent by raising or lowering the position of plate 31 relative to accelerator pedal 19. Additionally, the spring 32 selected for use on particular models of motor vehicle may be selected for the spacing between pedal 19 and floor board 20. The advantage to the use of a volute spring such as 32 is that the spring collapses upon itself as it is compressed and therefor essentially full depression of the accelerator pedal without interference is possible.

Referring now to FIG. 4, there is shown in diagrammatic form an apparatus 50 for resisting the opening of the throttle of a motor vehicle beyond a certain point through the use of a spring biasing arrangement on the carburetor linkage. In this embodiment, accelerator pedal 19 is moved toward floor board 20 in the usual fashion to effect opening the throttle of the motor vehicle through carburetor linkage 58 which is coupled to accelerator pedal 19 through opening 60 in floor board 20.

Spring 52 is rigidly attached at one end to collar 51 which is fixed to rod 55 by a set screw inserted through collar 51. The other end of spring 52 is rigidly attached to stop 53 at the end of sleeve 54. When accelerator pedal 19 is depressed and rod 55 pivots away from carburetor 59, sleeve 54 moves through an opening in bracket 56 which is rigidly attached to a fixed portion of the motor vehicle such as the fire wall or motor 57. The opening in bracket 56 is large enough to allow the movement of sleeve 54 until stop portion 53 of sleeve 54 contacts bracket 56. Stop portion 53 of sleeve 54 is larger than the opening in bracket 56 and further movement of stop portion 53 relative to bracket 56 is prohibited. Thereafter, further movement of linkage rod 55 causes compression of spring 52 since collar 51 is fixed to both rod 55 and an end of spring 52. The spacing shown in FIG. 4 between stop 53 and bracket 56 is wider than in actual use for purposes of illustration. In practice, stop portion 53 would be closer in its initial orientation to bracket 56, so that stop portion 53 would come in contact with bracket 56 after partial depression of accelerator pedal 19 and movement of rod 55, for example, to the point at which the motor vehicle is moving at a speed of 55 miles per hour on level ground.

Figure 5:
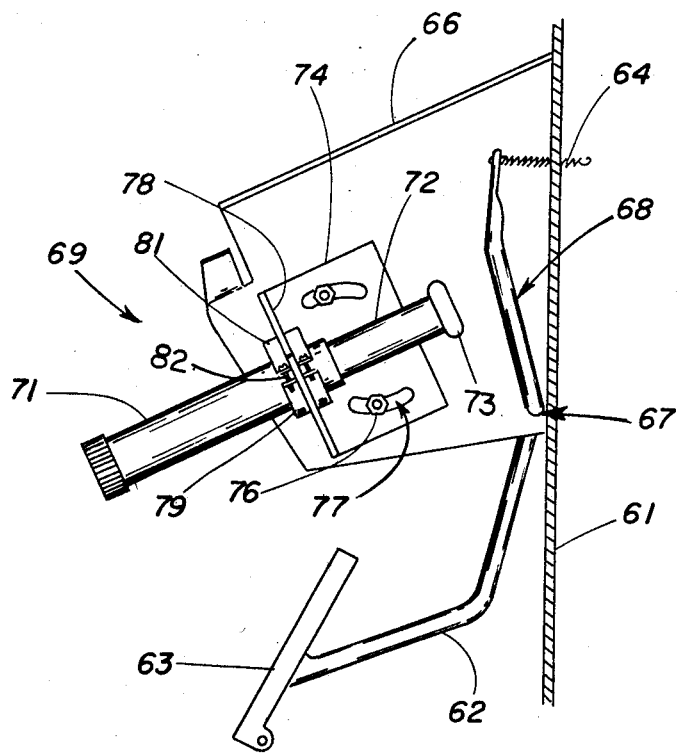
FIG. 5 is a side view of another embodiment of the present invention.
Figure 6:
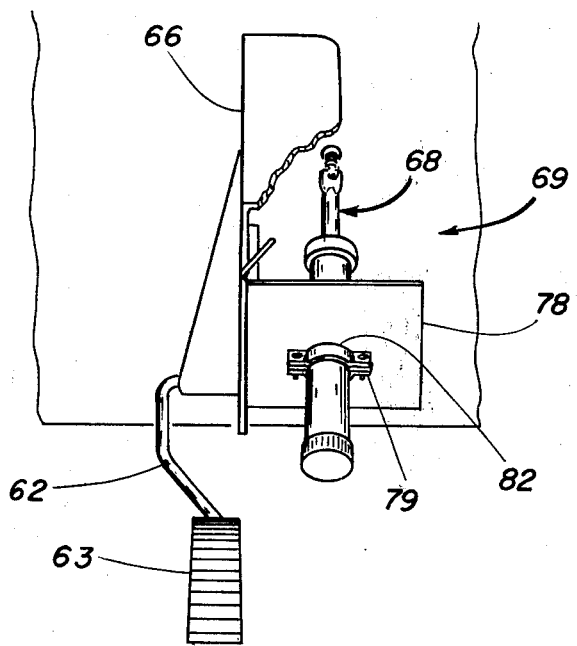
FIG. 6 is a top view of the apparatus of FIG. 5.

Referring now to FIGS. 5 and 6, there is shown an embodiment of the present invention for a different type of accelerator pedal rod arrangement. Accelerator pedal 63 is coupled by rod 62 to carburetor linkage 64. Carburetor linkage connection 64 passes through fire wall 61 of the motor vehicle. A bracket 66, standard on many American cars, extends from fire wall 61 in the vicinity of acclerator pedal rod 62 a shown. Rod 62 contains a portion normal to the page as shown in FIG. 5 in the vicinity indicated by numeral 67 and is pivotally coupled to the fire wall at that location. When accelerator pedal 13 is depressed, top portion 68 of rod 62 moves toward the speed control device generally indicated 69. Speed control device 69 comprises an outer hollow tube 71 which receives an inner hollow tube 72 in sliding engagement, similar to the devices shown in FIGS. 1 and 2. A rod-engaging head 73 is provided at the end of tube 72 to be connected by the upper portion 68 of rod 62.

A mounting bracket 74 is adjustably mounted on bracket 66 by nuts and bolts as indicated at 76. Mounting bracket 74 has a pair of slots to permit the adjustable location of mounting bracket 74 relative to bracket 66, positioning head 73 at a predetermined distance from rod 62. A front wall 78 of mounting bracket 74 contains lower ledges such as 79 for receiving outer tube 71 thereon. Clamp members 81 are attached securely with screws such as 82 around the upper portion tube 71, holding the tube in a fixed position relative to bracket 74. As can be seen, the arrangement as shown will permit a certain degree of depression of accelerator pedal 63, with an associated degree of speed of the motor vehicle, until a portion 68 of rod 62 contacts head 73 of cylinder 72. Thereafter, internal spring tension, such as is described in regard to the embodiment of FIG. 1, yieldably resists further depresssion of pedal 63 as rod 62 bears against head 73.

Referring now to FIG. 7, there is shown an embodiment of the present invention somewhat similar to that of FIG. 4. Accelerator pedal 86 is depressed, moving linkage 87 to the right rotating throttle lever 89 of carburetor 88, opening the throttle. At the same time as linkage 87 moves to the right, link 91 is also constrained to move in a similar fashion. A speed control device similar to that shown in FIG. 1 is employed to provide a speed control in the apparatus of FIG. 7. A hollow inner cylinder 92 is received under spring tension within outer cylinder 93. The extent of tension is determined by nut 94, which corresponds to nut 16 in the apparatus of FIG. 1. Outer cylinder 93 is attached to bracket 96 by mounting straps 98. Bracket 96 is attached to the motor vehicle such as by bolts 97. An additional nut 99 is fixed on the end of threaded shaft 101, which corresponds to shaft 15 in the apparatus of FIG. 1. As link 87 and member 91 are moved to the right under the action of accelerator pedal 86, an apertured flange portion 102 of member 91, which is received around threaded shaft 101, moves to the right until it contacts nut 99. Thereafter, further movement of links 87 and 91 to the right, with the attendant opening of the throttle, is performed against the spring tension provided within tubes 92 and 93.

Referring to FIGS. 8 through 11, another embodiment of the invention is shown. A steering column 106 of a motor vehicle receives a clamp arrangement 113 in tight-fitting engagement through the attachment of fasteners such as 114. An extension plate 112 is rigidly attached to clamp assembly 113 and serves as a support for the speed control apparatus of FIGS. 8 through 11. An accelerator pedal 107 is operable to engage the upper portion 108 of rod 109 as pedal 107 is depressed by the operator of the motor vehicle. Rod 109 further includes a portion 111, which receives free arm 116. Free arm 116 has an aperture therethrough by which it is pivotally mounted on rod 109 and around which it would be free to rotate but for the action of spring 117. Spring 117 is fixedly attached at a first end to nut 118 and at its other end over free arm 116 as shown in FIG. 10. When spring 117 is hooked over arm 116, nut 118 is rotated to increase the spring tension of spring 117 until a desired tension is reached, whereupon set screw 119 is tightened against rod 109 to maintain nut 118 in position.

As best shown in FIG. 8, free arm 116 bears against screw 121 by force of gravity. As screw 121 is inserted further into plate 112 free arm 116 is permitted to move lower, moving portion of rod 109 further below the level of undepressed accelerator pedal 107. For acceleration of the motor vehicle, as pedal 107 is depressed, it moves downward relatively freely until contacting portion 108 of rod 109. Thereafter further depression of pedal 107, and rotation of rod 109, is resisted by spring 117. Free arm 116 bears against the head of screw 121 while stop portion 111 of rod 109 moves downwardly. Upstanding legs such as 122 of portion 111 serve as guides to retain free arm 116 therebetween as rod portion 108 and 111 move downwardly. Stop portion 111 is fixed to rod 109 by set screws 111' as shown in FIG. 11.

As indicated, the tension provided by spring 117 may be adjusted by adjustment of nut 118 and the distance accelerator pedal 107 must travel before contacting rod portion 108 may be set by adjusting screw 121. The support for the assembly is provided by the clamping arrangement 113 and floor 122 of the motor vehicle may be used for support by positioning plate 112 on floor 122 or providing spacer elements between the plate and the floor.

Figure 12:
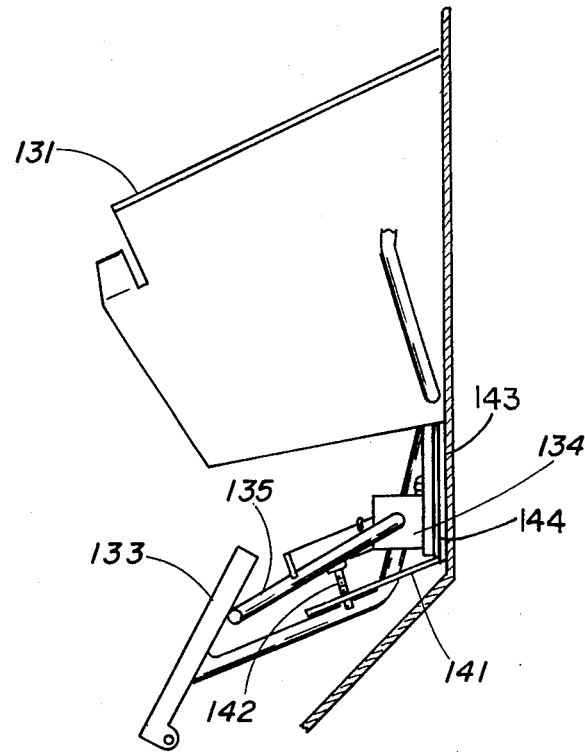
Figure 13:
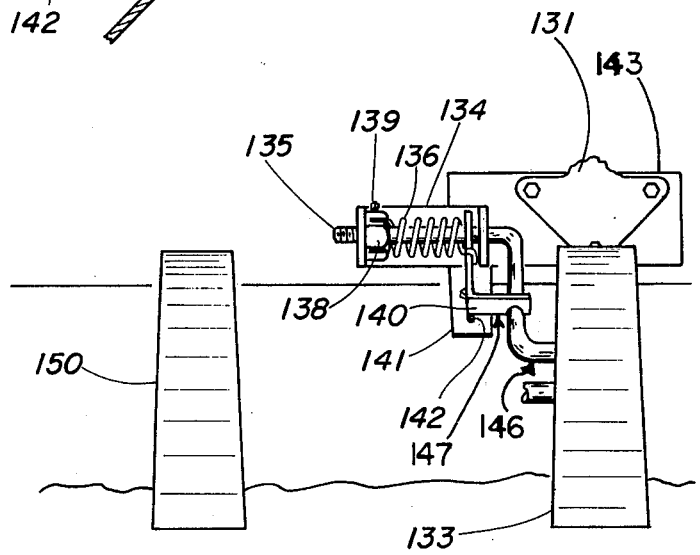

Referring now to FIGS. 12 and 13, another embodiment of the invention, somewhat similar to that shown in FIGS. 8 through 11, is shown. As shown in FIG. 12, a standard bracket 131, such as is described in regard to FIGS. 5 and 6 and therein designated item number 66, is provided as standard equipment on certain American Automobiles. The upper portion of bracket 131 is not shown in FIG. 13, but the attachment of the lower portion of bracket 131 by bolts to the firewall of the motor vehicle is illustrated in FIGS. 12 and 13.

A mounting plate 143 with appropriately located holes is mounted between the bottom of bracket 131 and a gasket 144 and the firewall of the motor vehicle. Mouting bracket 134, integral with plate 143, is provided to receive rod 135 of accelerator stop assembly. The operative principle of the assembly is basically the same as that for the apparatus shown in FIGS. 8 through 11. Rod 135 is rotatably received in bracket 134 and has a portion 146 which extends beneath accelerator pedal 113 in the form of a crank. As shown in FIG. 13, nut 138 is rigidly attached to rod 135 by a set screw 139 after the tension of spring 136 has been obtained as previously described. One end of spring 136 is fixed to nut 138 and the other end of spring 136 is hooked over free arm member 140, which is a generally L-shaped member. Free arm 140 is rotatably received on rod 135 and has a laterally extending portion 147 which engages the crank-connecting section of rod 135 as it extends toward and beneath accelerator pedal 133. Laterally extending portion 147 of free arm 140 is spring-biased against said crank-connecting section of rod 135 when accelerator pedal 133 is in its non-depressed position.

A flanged portion 141 of bracket 134 extends beneath free arm 140 and thereby receives screw 142, which serves essentially the same function as screw 121 of FIG. 8. As acelerator pedal 133 is depressed, it contacts rod portion 146 and rotates rod 135. Free arm 140 rests upon screw 142, and rotation of rod 135 is opposed by spring 136 as free arm 140 bears against screw 142. The indented portion of the lateral section 147 of free arm 140 is provided to assure that free arm 140 is engaged by rod 135 as the accelerator pedal is released. As described above in regard to the apparatus of FIGS. 8 through 11, the distance between rod portion 146 and accelerator pedal 133 may be set by varying the degree of engagement of screw 142 in flange 141 so that the extent of accelerator depression possible before encountering the tension of spring 136 may be varied.

While there have been described above the principles of this invention in connection with specific apparatus, it is to be clearly understood that this description is made only by way of example and not as a limitation in the scope of the invention.

What is claimed is:

1. In a motor vehicle having an accelerator pedal coupled through a linkage to a throttle control, the improvement which comprises spring means for yieldably opposing movement of the linkage after a predetermined amount of movement of the linkage, the yieldable opposition of the spring means being applied between the motor vehicle and the linkage, the spring means comprising a spring, coupled at a first end to the linkage and at a second end to a first stop member, and a second stop member attached to the motor vehicle and positioned to engage the first stop member afer said predetermined movement of the linkage.

2. In a motor vehicle having an accelerator pedal coupled by a pivoted rod and a linkage to a throttle control and having a floor including a portion adjacent to the accelerator rod and a fixed bracket extending from the floor of the motor vehicle in the vicinity of the accelerator pedal, the improvement which comprises speed control apparatus including:
   a mounting bracket including means for attaching the mounting bracket to the fixed bracket;
   a first hollow shaft;
   a second hollow shaft;
   means for retaining the first shaft in sliding engagement with the second shaft;
   means for attaching the first shaft to the mounting bracket;
   spring means for opposing increased sliding engagement between the first shaft and the second shaft, an end of the second shaft being spaced apart from and in the line of travel of a portion of the accelerator pedal rod such that depression of the accelerator pedal and the consequent pivoting of the accelerator rod brings the rod into contact with the second shaft and subsequent movement of the rod in the direction of the first shaft is yieldably opposed.

3. The improvement of claim 2 in which the mounting bracket is adjustably mounted on the first bracket.

4. Speed control apparatus for a motor vehicle having an accelerator pedal coupled through a linkage to a throttle control comprising:
   an arm;
   a rod member having a first portion upon which the arm is pivotally mounted, a second portion extending beneath the accelerator pedal and a third portion receiving the arm;
   means for rotatably mounting the rod near the accelerator pedal of the motor vehicle;
   a spring having a first end and a second end, the first end of the spring being fixedly coupled to the rod and its second end coupled to the arm; and
   stop means for receiving the arm, the spring biasing the third portion of the rod and the arm together with the arm resting upon the stop means, the stop means being located to position the second portion of the rod a preselected distance beneath the accelerator pedal, whereby depression of the accelerator pedal to the extent that it engages the second portion of the rod rotates the first portion of the rod against the tension of the spring moving the third portion of the rod beneath the arm with the arm remaining upon the stop means.

5. Speed control apparatus for a motor vehicle having an accelerator pedal coupled through a linkage to a throttle control comprising:
   an arm;
   a rod member having a first portion upon which the arm is pivotally mounted and a second portion extending beneath the accelerator pedal receiving a portion of said arm;
   means for rotatably mounting the rod near the accelerator pedal of the motor vehicle;
   a spring having a first end and a second end, the first end of the spring being fixedly coupled to the rod and the second end of the spring being coupled to the arm; and
   stop means for receiving the arm, the spring biasing the second portion of the rod and the arm together with the arm resting on the stop means, the stop means being located to position the second portion of the rod a preselected distance beneath the accelerator pedal, whereby depression of the accelerator pedal to the extent that it engages the second portion of the rod rotates the first portion of the rod against the tension of the spring, moving the second portion of the rod beneath the arm with the arm remaining upon the stop means.

* * * * *